United States Patent Office 2,693,822
Patented Nov. 9, 1954

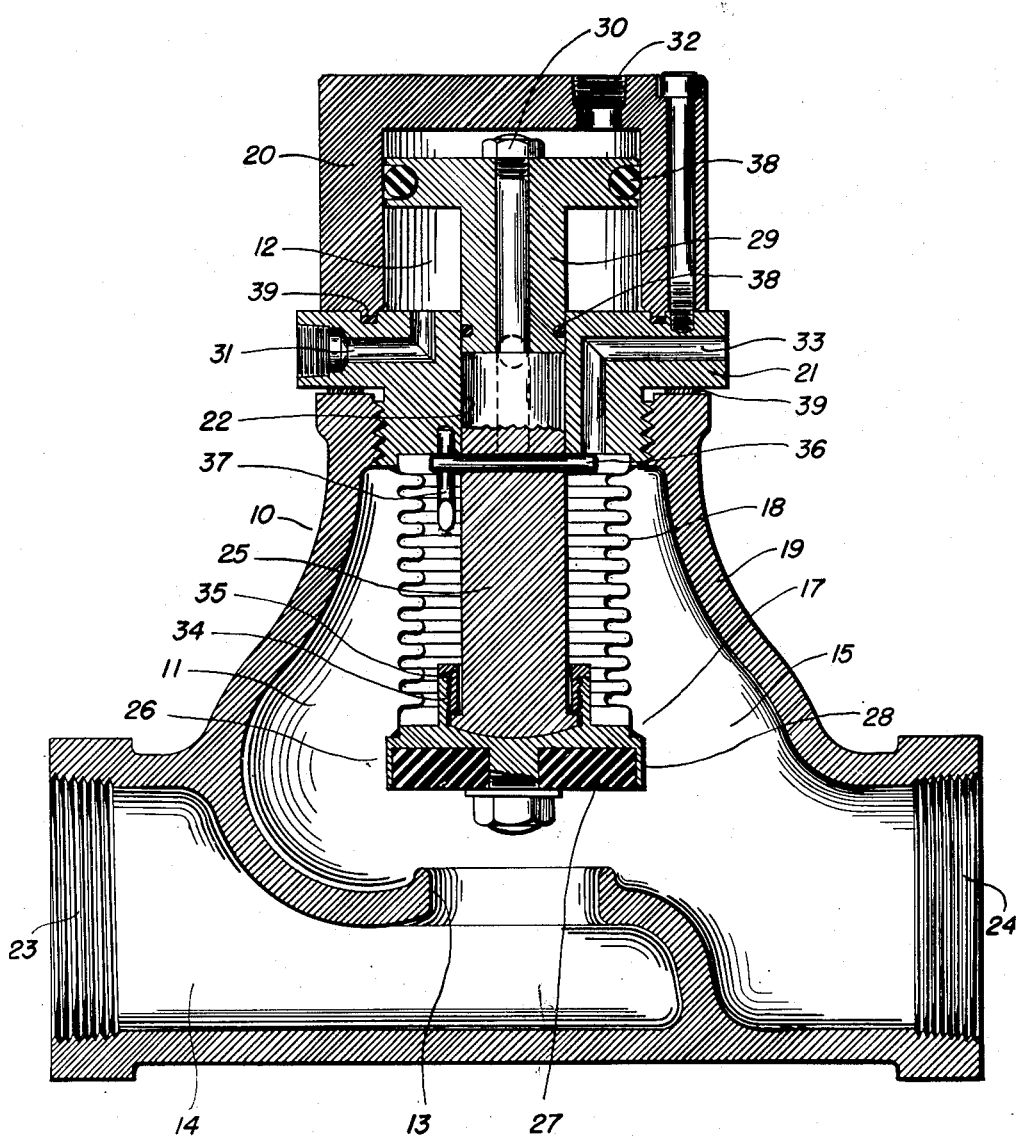

2,693,822

PISTON OPERATED VALVE WITH LEAK DETECTION MEANS

Gordon P. Gerow and James Wishart, Rochester, N. Y., assignors, by mesne assignments, to Consolidated Vacuum Corporation, Rochester, N. Y., a corporation of New York Application July 21, 1950, Serial No. 175,258

2 Claims. (Cl. 137—551)

This invention relates to valves and is particularly concerned with valve assemblies especially adapted for use in evacuated systems.

Many commercial processes are presently being carried out at pressures of from 1 mm. down to 1 micron of mercury or lower. Examples of such processes are vacuum distillation, evaporation coating with metals under vacuum, vacuum dehydration and the like. One of the problems encountered in constructing vacuum apparatus is the unsuitability of many standard devices for use under greatly reduced pressure. For example, many valves which are readily employed in fluid systems under normal pressure conditions cannot be employed in vacuum apparatus where even a small leak will make the attainment of a high vacuum unfeasible. The nature of much of the high vacuum apparatus is such that it is necessary that the valve be both vacuum-tight and compact.

It is accordingly an object of this invention to provide an improved valve assembly especially adapted for use in an evacuated system.

Another object of the invention is to provide a valve assembly for vacuum systems without sacrificing compactness.

Another object of the invention is to provide a fluid-actuated valve for use under reduced pressures.

Another object of the invention is to provide an improved valve assembly which can be readily checked for leaks during operation.

Another object of the invention is to provide a valve assembly including simple and effective means for sealing the moving parts against leakage during operation under vacuum.

Another object of the invention is to provide a valve assembly wherein either fluid port can be used as inlet or outlet in an evacuated system.

Another object of the invention is to provide a valve assembly which is fluid-actuated in positive fashion to both the open and the closed positions.

Another object of the invention is to provide a vacuum valve arranged to prevent rupture of the sealing elements during operation of the valve.

Another object of the invention is to provide a piston-actuated valve having a bellows sealing member.

Other objects will be apparent from the drawings, description and claims.

These and other objects are attained by means of this invention which is described more fully hereinafter with reference to a preferred embodiment as shown in the drawing, the single figure of the drawing being a sectional elevation of a valve assembly constituting a preferred embodiment of the invention.

Referring to the drawing, the preferred valve assembly embodying the invention comprises valve housing 10 defining bi-compartmented valve chamber 11 and valve-actuating or piston chamber 12, valve chamber 11 including apertured valve seat 13 permitting fluid flow through the compartments 14 and 15 of chamber 11; valve means 17 within housing 10 arranged for closing the aperture in valve seat 13; and bellows 18 constructed and arranged to form a vacuum tight seal about valve means 17.

In the preferred embodiment in order to facilitate fabricating, assembling and disassembling the valve assembly, valve housing 10 comprises valve chamber shell 19 and piston chamber shell 20 both secured to wall member 21 which serves as a removable cap for both chambers. Wall member 21 has an opening 22 therethrough adapted to receive a valve stem, opening 22 being generally in alignment with valve seat 13. Ports 23 and 24 in valve chamber shell 19 permit fluid flow through valve chamber 11, the ports being threaded for joining the valve assembly to the evacuated system.

Valve means 17 in housing 10 comprises valve stem 25 having the proximal portion extending into valve chamber 11 and the distal portion extending into opening 22 in wall member 21. Valve closure member 26 is attached to the proximal end of valve stem 25 and comprises a plug 27 of rubbery material secured in a confining cup member 28, valve closure 26 being arranged to move into and out of seating relation with valve seat 13 with plug 27 providing a positive seal on valve seat 13 when valve closure 26 is seated. Valve closure member 26 is mounted on valve stem 25 by means of an upturned threaded flange 34 on cup member 28 which engages threaded collar 35 on valve stem 25. The distal end of valve stem 25 is in cooperating relation with piston 29 which is disposed in piston chamber 12 and extends into opening 22 in wall member 21. Piston 29 is secured to the distal end of valve stem 25 by means of bolt 30 whereby piston 29 forms an extension of valve stem 25 and directly actuates valve stem 25. Pins 36 and 37 press fit into valve stem 25 and wall member 21 respectively and prevent stem 25 from turning when bolt 30 is tightened.

Piston chamber 12 has fluid ports 31 and 32 on opposite sides of piston 29 whereby actuating fluid can be admitted to chamber 12 to actuate piston 29 in either direction. Fluid port 31 is tapped in wall member 21 which forms a wall of chamber 12 and fluid port 32 extends through the top of piston chamber shell 20; both ports being threaded for connection to a source of compressed air or other actuating fluid.

Bellows 18 is a longitudinally extensible member of fluid-tight material and encloses the proximal portion of valve stem 25. One end of bellows 18 is secured to wall member 21 around opening 22 by adhesive or suitable mechanical fastening means to form a vacuum-tight seal with wall member 21. The other end of bellows 18 is secured to the cup member 28 of valve closure member 26 by adhesive or appropriate mechanical fastening means to form a vacuum-tight seal whereby the entire valve means 17 with the exception of sealing plug 27 is isolated from the interior of compartment 15 of valve chamber 11.

Channel port 33 in wall member 21 affords communication between the interior of bellows 18 and the exterior of the valve assembly, port 33 being arranged to serve as a leak detector port for testing bellows 18. A second port is hidden by stem 25.

Piston chamber 12 is so dimensioned as to limit the stroke of piston 29 to a distance less than the longitudinal extensibility of bellows 18, such distance being sufficient to move closure member 26 into and out of seating relation with valve seat 13.

The valve assembly is provided with the usual O-rings 38, 38 and gaskets 39, 39 which prevent air leakage around the piston and into the valve chamber.

In operating the valve assembly illustrated in the drawing, the assembly is connected to the system to be evacuated by means of threaded ports 23 and 24. Either port can serve as inlet or outlet port since the valve assembly acts positively in either direction and it is immaterial whether the vacuum in the system acts to open or to close the valve. With the valve assembled as illustrated in the drawing, fluid ports 31 and 32 are connected to a source of actuating fluid, the flow of actuating fluid and hence the operation of the valve being controlled from a point remote from the valve as at a central control panel for the entire apparatus in which the valve assembly is employed.

The valve is closed by applying fluid pressure to piston 29 through port 32 whereby piston 29 is forced downwardly against wall member 21 and forces valve stem 25 downwardly until plug 27 of closure member 26 seats on valve seat 13. During the downward stroke of valve stem 25, bellows 18 is longitudinally extended. The valve assembly is constructed so that bellows 18 cannot be overextended by the stroke of piston 29 and hence there is no danger of rupturing bellows 18 and there is no objectionable strain on bellows 18 which would tend to break the vacuum-tight seal between bellows 18 and wall member 21 and cupping member 28 respectively.

The valve is opened by releasing the fluid pressure exerted through fluid port 32 and applying fluid pressure through fluid port 31 whereby piston 29 is urged upwardly, pulling valve closure member 26 into open position. The accordion pleats in bellows 18 permit bellows 18 to compress without strain whereby a positive vacuum seal is maintained. The upward stroke of piston 29 is limited by shell 20 so that bellows 18 cannot be squeezed between cup member 28 and wall member 21 to any objectionable degree.

Leak detector port 33 permits introduction of a tracer gas into the interior of bellows 18 for testing the impermeability of bellows 18 during service or when an attempt is being made to find a leak somewhere in the apparatus. Port 33 also allows bellows 18 to "breathe" during compression and extension of the bellows in service so that the bellows does not interfere with the free action of the valve and the bellows is not deformed by internal pressure changes. The second port permits flushing of the bellows to remove tracer gas.

The valve embodying the invention thus is adapted for positive double action whereby either main port can serve as either inlet or outlet port. The action of the valve is extremely rapid in either direction for almost instantaneous opening or closing. The valve assembly is compact and no appreciable operating space outside the valve assembly is necessary whereby the valve can be employed anywhere in a vacuum system without necessitating space for direct manual operation. The valve can be controlled from a point remote from the valve whereby a complex vacuum apparatus employing a plurality of valves can be operated from a central control panel. Substantially all moving parts of the valve are isolated from the vacuum system by the bellows and moving seals are not necessary to maintain vacuum conditions. The valve is constructed to minimize the possibility of failure in service by preventing rupture of the bellows seal except as would occur normally from extended use. The leak detector port provides a ready means for testing the valve even during service.

While the invention has been described in considerable detail with reference to certain preferred embodiments thereof, variations and modifications can be effected without departing from the spirit and scope of the invention as illustrated and described and as defined in the appended claims.

What we claim is:

1. An assembly particularly adapted for use in vacuum systems and comprising housing means defining a valve chamber, shell means defining a piston chamber, a capping element interposed between said housing means and said shell means and forming a common wall between said chambers, means removably securing said capping element to said housing means and to said shell means, said housing means including partition means dividing said valve chamber into two compartments, a valve port in said partition means and interconnecting said compartments, an inlet port into one of said compartments, an outlet port from the other of said compartments, an opening through said capping element in general alignment with said valve port and adapted to receive a valve stem, piston means in said piston chamber, valve closure means in said valve chamber, valve stem means extending through said opening in said capping element and connecting said piston means and said valve closure means, means releasably securing said piston means to one end of said valve stem means, means releasably securing said valve closure means to the other end of said valve stem means, vacuum tight bellows means disposed in said valve chamber and encircling said valve stem means, one end of said bellows means being secured to said valve closure means, the other end of said bellows means being secured to said capping element around said opening, fluid ports opening into opposite ends of said piston chamber for introducing actuating fluid for reciprocating said piston means, sealing means arranged for minimizing leakage of actuating fluid from said piston chamber into said bellows means through said opening, and channel port means opening through said capping element and connecting the interior of said bellows means with the exterior of said assembly.

2. An assembly particularly adapted for use in vacuum systems and comprising a valve chamber housing including an internal partition dividing the valve chamber defined by said housing into two compartments, a piston chamber shell, a capping element interposed between said housing and said shell and forming a common wall for the valve chamber defined by said housing and the piston chamber defined by said shell, means for removably securing said capping element to said housing and to said shell, an inlet port opening into one of said compartments, an outlet port opening out of the other of said compartments, said inlet and outlet ports being adapted to connect said assembly into a vacuum system, a valve port in said internal partition for interconnecting said compartments, a valve stem opening in said capping element and interconnecting said piston chamber and said valve chamber, said valve stem opening being in general alignment with said valve port, valve closure means disposed in said valve chamber and adapted to close said valve port, piston means disposed in said piston chamber, valve stem means disposed in said valve stem opening, means removably securing said valve closure means to one end of said valve stem means, means removably securing said piston means to the other end of said valve stem means, vacuum tight bellows means disposed in said valve chamber and encircling said valve stem means, one end of said bellows means being secured to said valve closure means around said valve stem means, the other end of said bellows means being secured to the valve chamber face of said capping element around said valve stem opening, a fluid port in said capping element and opening into said piston chamber on one side of said piston means, a second fluid port in said shell and opening into said piston chamber on the opposite side of said piston means, and at least one channel port in said capping element connecting the interior of said bellows means with the exterior of said assembly.

References Cited in the file of this patent

UNITED STATES PATENTS

| Number | Name | Date |
| --- | --- | --- |
| 350,881 | Graham | Oct. 12, 1886 |
| 412,789 | Probert | Oct. 15, 1889 |
| 1,638,110 | Carrey | Aug. 9, 1927 |
| 1,685,418 | Foulds | Sept. 25, 1928 |
| 1,903,229 | Colman | Mar. 28, 1933 |
| 2,153,213 | Thomas | Apr. 4, 1939 |
| 2,414,629 | Bloss | Jan. 21, 1947 |
| 2,439,523 | Miller | Apr. 13, 1948 |
| 2,516,151 | Scott | July 25, 1950 |

FOREIGN PATENTS

| Number | Country | Date |
| --- | --- | --- |
| 562,668 | France | Sept. 12, 1923 |